United States Patent
Morovic et al.

(10) Patent No.: US 10,611,089 B2
(45) Date of Patent: Apr. 7, 2020

(54) THREE-DIMENSIONAL OBJECT PROPERTY DETERMINATION

(71) Applicant: HEWLETT-PACKARD DEVELOPMENT COMPANY, L.P., Houston, TX (US)

(72) Inventors: Peter Morovic, Sant Cugat del Valles (ES); Jan Morovic, Colchester (GB); Ingeborg Tastl, San Mateo, CA (US); Lihua Zhao, Sunnyvale, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/562,377

(22) PCT Filed: Jul. 28, 2015

(86) PCT No.: PCT/US2015/042525
§ 371 (c)(1),
(2) Date: Sep. 27, 2017

(87) PCT Pub. No.: WO2017/019046
PCT Pub. Date: Feb. 2, 2017

(65) Prior Publication Data
US 2018/0281285 A1    Oct. 4, 2018

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/386* (2017.08); *B33Y 30/00* (2014.12); *B33Y 50/02* (2014.12)

(58) Field of Classification Search
CPC ..... B29C 64/393; B29C 64/386; B33Y 30/00; B33Y 50/02
(Continued)

(56) References Cited

U.S. PATENT DOCUMENTS

| | | |
|---|---|---|
| 8,767,277 B2 | 7/2014 | Uroz Soria et al. |
| 2005/0036674 A1 | 2/2005 | Be'er et al. |

(Continued)

FOREIGN PATENT DOCUMENTS

| | | |
|---|---|---|
| JP | 2002-292748 | 10/2002 |
| JP | 2002292748 A * | 10/2002 |

(Continued)

OTHER PUBLICATIONS

Li, et al; "The Calibration Algorithm of a 3D Color Measurement System Based on the Line Feature"; I.J. Image, Graphics and Signal Processing; 2009, 1, 17-14; Published Online Oct. 2009 in MECS (http://www.mecs-press.org/).

*Primary Examiner* — Mohammad Ali
*Assistant Examiner* — Joshua T Sanders
(74) *Attorney, Agent, or Firm* — HP Inc. Patent Department (57) ABSTRACT

In one example, a method comprises receiving data representing a first property of a three-dimensional object generated by a print apparatus, the data having been determined by measurement of the object. A difference between the data representing a first property and predetermined data may be determined, and, based on the difference, an estimate of a second property of the object may be determined.

16 Claims, 3 Drawing Sheets

(51) Int. Cl.
*B29C 64/386* (2017.01)
*B33Y 30/00* (2015.01)

(58) Field of Classification Search
USPC .......................................................... 700/98
See application file for complete search history.

(56) References Cited

U.S. PATENT DOCUMENTS

| | | |
|---|---|---|
| 2007/0241482 A1 | 10/2007 | Giller et al. |
| 2009/0152771 A1 | 6/2009 | Philippi et al. |
| 2011/0222081 A1 | 9/2011 | Yi et al. |
| 2015/0013079 A1* | 1/2015 | Golz .................. A62B 35/0075 8/638 |
| 2015/0024319 A1 | 1/2015 | Martin |
| 2015/0168134 A1* | 6/2015 | Yanai ..................... B41J 11/009 347/16 |
| 2015/0172636 A1* | 6/2015 | Gordon ................ H04N 5/2354 348/46 |
| 2017/0232758 A1* | 8/2017 | Inagawa .............. B41J 2/04581 347/15 |

FOREIGN PATENT DOCUMENTS

| | | |
|---|---|---|
| JP | 2007074484 | 3/2007 |
| JP | 2008061159 | 3/2008 |
| WO | WO-2014-015994 A1 | 1/2014 |

* cited by examiner

THREE-DIMENSIONAL OBJECT PROPERTY DETERMINATION

BACKGROUND

Three-dimensional objects generated by an additive manufacturing process may be formed in a layer-by-layer manner. In one example of additive manufacturing, an object is generated by solidifying portions of layers of build material. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three-dimensional objects may be generated by using extruded plastics or sprayed materials as build materials, which solidify to form an object.

Some printing processes that generate three-dimensional objects use control data generated from a model of a three-dimensional object. This control data may, for example, specify the locations at which to apply an agent to the build material, or where a build material itself may be placed, and the amounts to be placed. The control data may be generated from a three-dimensional representation of an object to be printed. Some examples allow arbitrary three-dimensional content with a variety of specified object properties to be processed and used to generate a three-dimensional object. These object properties may comprise appearance properties (color, translucency, gloss, etc.), conductivity, density, porosity and/or mechanical properties such as strength.

BRIEF DESCRIPTION OF DRAWINGS

For a more complete understanding, reference is now made to the following description taken in conjunction with the accompanying drawings in which.

DETAILED DESCRIPTION

In some examples described herein a three-dimensional object which is intended to have a variety of specified object properties may be generated. These object properties may for example comprise appearance properties (color, transparency, glossiness, etc.), conductivity, density, porosity and/or mechanical properties such as strength.

When generating an object, it may be the case that multiple properties are specified for one or multiple portions of the object. For an object generation apparatus, a 'canonical' set of print parameters used by the apparatus may be intended to result in properties having predetermined canonical values (which may have been achieved or defined for example through calibration of the apparatus), and may be used to produce a consistent and repeatable output. For example, control data may be intended to control an object generation apparatus to consistently produce an object having, in a least a region thereof, a certain color and density, and this may be associated with applying certain print parameters (such parameters may comprise a temperature, the order of printing and fusing cycles, the distribution of print materials, power supplied to fusing apparatus, etc.). However, tolerances and wear of an apparatus over time may mean that the output properties vary, even when the print parameters are nominally unchanged. In order to maintain the object properties to within predetermined tolerances, object properties may be measured and aspects of the object generation process may be controlled such that these stay within or tend towards intended values or ranges.

Figure 1:
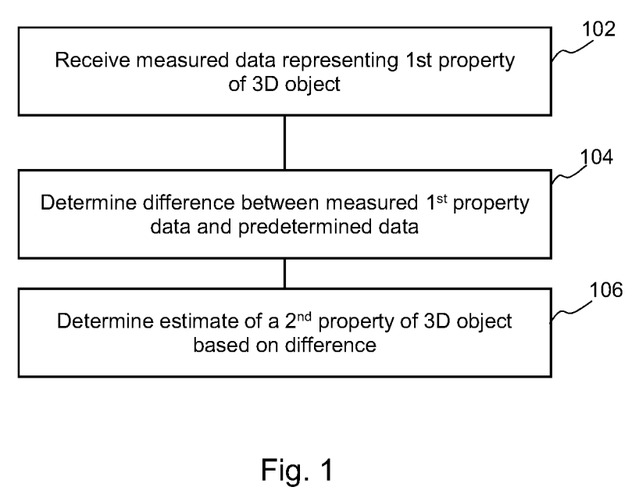
FIG. 1 is a flowchart of an example of a method for estimating an object property.

FIG. 1 is an example of a method for use, for example in association with a three-dimensional object generation apparatus. The method comprises, in block 102, receiving data representing a first property of a three-dimensional object generated by a print apparatus, the data having been determined by measurement of the object. The property may be a global property of the object, i.e. the same over the object as a whole, or may be a local property, i.e. a property of a portion of an object. In block 104, any difference between the measured data and predetermined data is determined. In block 106, this difference (if any) is used to determine an estimate of a second property of the object. If the measured property is a property of a portion of an object, the estimate of the second property of the object may be an estimate of the property for the same portion of the object.

The measurement of one property (the first property) of the object is therefore used to infer another property (the second property), which may not be measured directly. As not all properties need be measured, this may reduce measurement time and/or the amount and variation in type of sensors which may be included in a print apparatus. Further, measurement of some object properties may be incorporated into object generation processes, for example using measurement apparatus which may be incorporated within an object generation apparatus, or readily employed 'in-line' in object generation processes. Other properties may be more laborious to measure, for example including manual handling and off-line measurement, and/or comprise measurement techniques which may be destructive or damaging to an object. In some examples, the first property may be a property which is relatively easy to measure as part of an in-line process (for example, being measured by remote, or optical, inspection), while the second property may be one which is less easy to measure (for example requiring handling or use of a sensor which cannot easily be incorporated into a print apparatus). By way of example, the first property may be a color, and the second property may be density, or tensile strength. As the second property is inferred rather than measured, the (in some examples, relatively lengthy and/or complex) direct measurement of this property is avoided.

Figure 2:
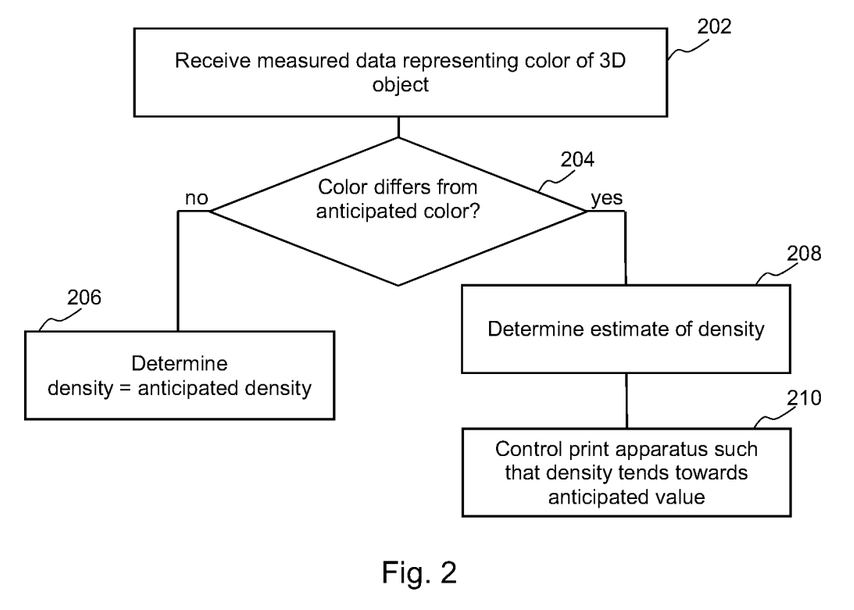
FIG. 2 is a flowchart of an example of a method for controlling print apparatus.

FIG. 2 is an example of a method in which, in block 202, data representing a color of at least a portion of a three-dimensional object generated by a print apparatus (which may comprise part of an object generation apparatus) is received, the data having been determined by measurement of the object. In block 204, it is determined whether the measured color data differs from an anticipated value. If not, an estimate of density is made according to a predetermined canonical value for that print apparatus (block 206), i.e. there is a determination that density has the anticipated value for the set of print parameters used to generate that object. If the color measurement relates to just a portion of the object, the density may also be determined for that portion, or at least one inferred density value may be determined for the object as whole on the basis that the change in color may be indicative of a change in underlying print conditions, which apply to both measured and unmeasured portions of the object. If there is a difference, an estimate of density is made (block 208). This estimate may in some examples be determined as an offset from the canonical value for density.

In this example, these properties (color and density) may be linked on the basis, for example, that the agent which provides a color also contributes material which adds mass. If less material (such a print agent) is deposited, this may result in both a weaker color and a lower density (in other examples, a stronger color may indicate a reduction in density, depending on the agent used).

In other words, density and color are examples of properties which are at least in part affected by common underlying printing operations, and are at least partially correlated. Color is an example of a property which may be determined with relative ease in-line as part of a print operation (for example, it may be measured remotely using optical inspection), whereas determining density directly is more involved (in particular if the object has regions of differing densities) and may demand other sensor apparatus. Therefore, inferring, rather than measuring, density may save time and complexity.

In block 210, the print apparatus is controlled such that the density tends towards the predetermined value. This may in some examples follow a determination that the density of the object differs from the anticipated value by more than a predetermined amount (i.e. a tolerance range). In some examples, this may further indicate a change in the underlying print conditions, such as a deterioration in the print apparatus. In some examples, the control may comprise control of at least one print parameter.

In some examples, the controlled print parameter(s) may for example comprise any, or any combination, of: printing speed, printing temperature, printing cycle order, waiting period length, power supplied to an energy source of the print apparatus, and distribution of print materials.

Controlling printing speeds may comprise controlling the length of fusing and/or printing cycles, and hence may control the amount of energy received by a print material. Where printing temperature is controlled, this may for example be a fusing temperature (i.e. the temperature to which a generated object is heated to cause the build material to coalesce), a pre-heating temperature, or control of the temperature during cooling of a generated object. Waiting periods may comprise a time allowed for cooling (dwell time), or a time between printing cycles. An apparatus may cycle between stages of supplying a print material (for example, applying drops of an agent to a build material) and causing fusing. Controlling the print cycle order may comprise changing this order, for example, it could be that each application of agent is followed by one or multiple fusing stages, or that multiple applications of agent are followed by one or multiple fusing stages. The cycle order may be different for different periods in object generation. Control of the power supplied to an energy source of the print apparatus (for example, a fusing lamp) may be an absolute power level (for example, a predetermined wattage) and/or control of how that power is supplied (for example, the length and duration of a pulse of power). Control of print material distribution may comprise control of quantity and/or placement of print material, where print materials may comprise build material and/or any print agents. This may for example mean use of different drop sizes, different quantities of drops, or use of a different halftoning technique to determine where drops of agent are applied.

If, for example, a color measurement shows a change in saturation, this may addressed by any, or any combination of changing (increasing or decreasing) fusing, pre-fusing, or post generation 'dwell time' temperature, changing the distribution of print materials (e.g. using additional agents, for example through use a different number or different size of drops of a liquid agent, or through use of a halftoning technique (for example, a denser or sparser halftone matrix may be used) which results in a change to the quantity of print material applied), or a change in some other parameter.

In this example, therefore, measurement of a colorimetric property is used to infer a value of a non-colorimetric property, and to control the print apparatus if non-colorimetric property is determined to differ from an anticipated value.

More generally, the method allows for compensation for deviations from a nominal state in a domain (for example density) that is not directly measured. In addition, in some examples, feedback may be used to ensure that objects are produced within certain tolerances for any of a series of properties, which may include those which are not measured directly, for example by use of a closed control loop. This may result in a more reliable and consistent object output over time. As in some examples measurements may be made in-line, such a control loop may be implemented within a production run of a series of objects without slowing the production run unduly.

In one example, a set of test objects may be printed using control data. A reference, or 'canonical', set of printing parameters may be used in a print apparatus to produce a test object, and versions of the test object may also be generated using a variety of printing conditions that differ in print parameters such as printing speed, agent drop size (which may change with agent distributor age), fusing temperature, fusing time, pre-heating conditions, and the like. In some examples, the variations in print parameters may include or mimic those changes which may occur due to degradations or changes in a print apparatus (e.g. ageing of fusing lamps/mechanism, variation in heat (which may mimic ageing in heat control apparatus of the print apparatus, or external temperature changes), print agent distributor health, and the like). In some examples, one parameter at a time is changed and the corresponding object properties are recorded. In other examples, a set of parameters may be altered. This may result in variation in at least one object property. The test objects may be designed such that the properties of interest can be measured from one and the same object in an efficient way (e.g. with consideration of size and shape) and the resources (e.g. material, time) are minimised.

The measurements of at least one such test object can be used to determine a relationship, which may for example be in the form of a look-up table or function representing the relationship between the properties and the print parameters which produced the object having the properties.

Thus it may, for example, be determined that a particular fusing temperature results in a color having a particular chroma value and a particular density, whereas a lower fusing temperature (with all other parameters unchanged) increases the chroma and the density. These measurements may be made in-line, or off-line using measurement devices.

In an example, conversion look up tables are defined linking changes in CIE XYZ colorimetry and changes in Density D such that:

[$\Delta XYZi \rightarrow \Delta Di$] for a sufficient sampling of XYZs and Ds such that between nodes i and i+1 a linear interpolation can be applied, where $\Delta XYZi = XYZi(\text{non-canonical}) - XYZi(\text{canonical})$, and $\Delta Di = XYZi(\text{non-canonical}) - XYZi(\text{canonical})$, i.e. the difference in color and density that is caused by a particular change in print parameters is measured. For example, the colorimetry and density may be determined for a test object under a variety of fusing temperatures—one of which is the canonical temperature and the others being a range of non-canonical temperatures which may be anticipated, for example due to apparatus ageing or changes in environmental temperatures or the like, during print operations—may be determined.

In another example, a functional relationship can be established whereby $f(\Delta XYZ) = \Delta D$, where f( ) could be any suitable derived or chosen function. For example, if density changes relate inversely and non-linearly to chroma changes, this can be expressed by a suitably chosen function f( ).

In a further example, these techniques can be combined such that a number of nodes (possibly a relatively small number, e.g. in the order of 5-50 nodes) is established, and coupled with a non-linear interpolation domain (e.g. determined by f( )). The number of nodes may depend on factors such as how well an object property can be represented by a some global function (for example, can the properties of points between nodes be accurately represented by a function?) and overall behaviour. The number of nodes may be relatively low (e.g. 9) if the nodes are well selected and properties there-between can be assumed to follow well modelled, for example linear, behaviour. It may be higher (e.g. 17 or 33) if a property is less accurately represented by some function.

Figure 3:
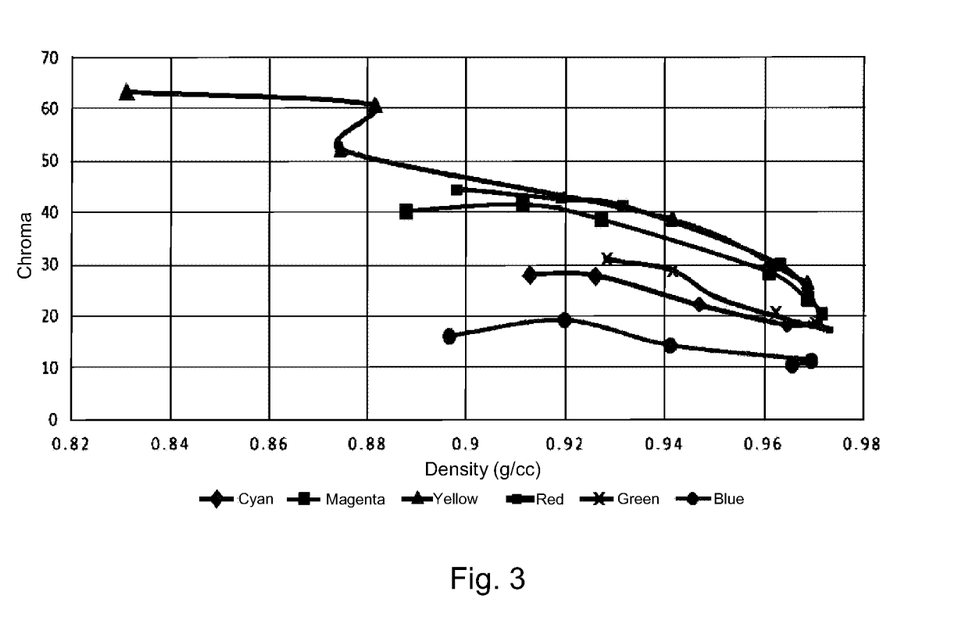
FIG. 3 is an example of relationships between colorimetric data and density.

FIG. 3 shows an example of relationships between different object properties with varying print parameters. In particular, FIG. 3 shows various colorimetric properties (i.e. various colors) and densities for a test object printed using different print parameters. In the example of FIG. 3, cyan, magenta and yellow (CMY) agents were used to color a generated three dimensional object. Fusing lamp power in Watts (W) and/or controlled using pulse-width modulation, PMW, and printing speed in inches/sec (ips) were varied. For each set of print parameters, the same control data was used to print six test objects, one in each of red, green, blue, cyan, yellow and magenta. Chromatic data was measured for each object, and the density was determined. For example, for the set of cyan objects:

| Print parameters | Density (g/cc) | Chroma |
|---|---|---|
| 300 W, 8.5 ips | 0.9127 | 28.1641 |
| 300 W, 7.5 ips | 0.9468 | 22.1504 |
| 750 W, 0.48 PWM, 16 ips | 0.97 | 18.4934 |
| 750 W, 0.52 PWM, 18 ips | 0.9647 | 18.2863 |
| 500 W, 0.52 PWM, 12 ips | 0.9259 | 27.8821 |

As can been seen from the table above and FIG. 3, both color and density are affected by the changes in print parameters. Therefore, a departure from a particular color value may indicate that density has also changed. Moreover, this may indicate that a printing parameter may have changed and this change may be compensated for. As indicated in FIG. 3 (for example for a yellow test object) chroma and density may be inversely related, meaning a higher chroma value corresponds to a lower density value. An identified relationship between two properties can be modelled.

In some examples, to establish and potentially compensate for spatial non-uniformity, several test objects may be placed within the test-bed, and used to provide a relationship for an associated region of the test-bed.

The relationship between object properties, and/or the relationship between properties and print parameters may be predetermined for a particular print apparatus, for a class or type or print apparatus, and/or bearing in mind a particular print material (or particular combination of print materials). In an example, the relationships may be pre-established in a characterization stage for a given set of print materials/print conditions.

Although in the illustrated example, colorimetric properties are expressed in a particular manner, colors may be measured and quantified in a variety of different color spaces (e.g. CIE Lab, CIE LCH) or different dimensions (e.g. one dimensional Chroma), and/or may be determined for a subset of colors, for example for primary colors or secondary colors.

The properties measured may be selected such that changes may be captured using a relatively small number of measurements and/or on the basis that that property provides a clear indicator for changes in at least one other property to be inferred therefrom.

Once such relationship(s) between two or more properties has/have been established, when an object which is intended to have particular object properties is printed, measurement of a first property of that object may be made. The difference from a canonical value (in the example above, $\Delta XYZ$) can be used to determine an estimate of an offset (in the example above, $\Delta D$) between the canonical value of the second property, and the inferred value of that property, and may in turn be used to determine the inferred value of the second property. In one example the first property is at least one color, which can be measured relatively easily, in some examples using apparatus which can be incorporated into the print apparatus. Colorimetric information for an object, or a region of an object, may for example be measured by a colorimeter, spectrophotometer or a calibrated camera system. As in-line and off-line color measurements may differ (for example, the color of an object may change as it dries and/or cools), in some examples, the measurement conditions used in measuring test objects may be replicated in later object generation processes. Furthermore, a relationship between the final color properties of an object as measured off-line and the color properties measured in-line might be established and used.

Objects can be printed, measured and used for calibration in different ways. For example, a "draft" object may be printed before a series of customer, or production, three-dimensional objects is to be generated. This draft object may be measured and a calibration of the print apparatus performed if the measurements infer that certain properties are not as intended. In other examples, all or some generated objects may be measured throughout a production run of objects, and the print apparatus recalibrated if certain properties are not as intended. In other examples, such may occur during generation of an object. For example, a measurement of the first object property could be made after a layer of the object is generated and print parameters recalibrated for the generation of the subsequent layers.

According to some examples, if an object is printed which is intended, according for example to control data, to have a particular colorimetry and density, then a departure ($\Delta XYZ$) of the color from the anticipated color can be used to infer an offset from the canonical value (or values, as the object may comprise regions of different density) of density for the object. In one example, in a particular application, appearance properties may be a secondary consideration to structural properties such as density, but may also be relatively easy to measure.

In other words, the measured colorimetric values allow $\Delta XYZ$ to be evaluated. This can be used to determine an estimate of $\Delta D$. By adding $\Delta D$ to the canonical density value, an estimated value for the density for the current state of the print apparatus can be determined.

In other examples, colorimetric information may have a relationship with a range of properties, and an indication of all such properties could be determined. For example, variations in color can be used to provide an indirect estimate of tensile strength, on the basis that density provides an indication of tensile strength. Estimating tensile strength via color may avoid direct measurement, which in the case of strength measurement is often disruptive or damaging to an object under test. Furthermore, variations in color could indicate variations in object roughness which in turn impacts the gloss/reflectance of an object. However, in an example, any departure from a canonical value for any property related to density may be best corrected by adjusting a first parameter, while the reflectance may be best corrected by adjusting a different parameter. In some examples, as further detailed below, a hierarchy may be used to identify at least one parameter to adjust.

As outlined in relation to block 210, differences between either a measured property or a property inferred from the measured property and the anticipated value(s) for that property may, in some examples, be compensated for, for example by recalibration of the apparatus. If it is determined, from a change in color, that density is reduced, the recalibration may for example result in increased or decreased agent being used, which may affect both the color and the density, in some examples such that the intended values of both properties are seen in a generated object.

Figure 4:
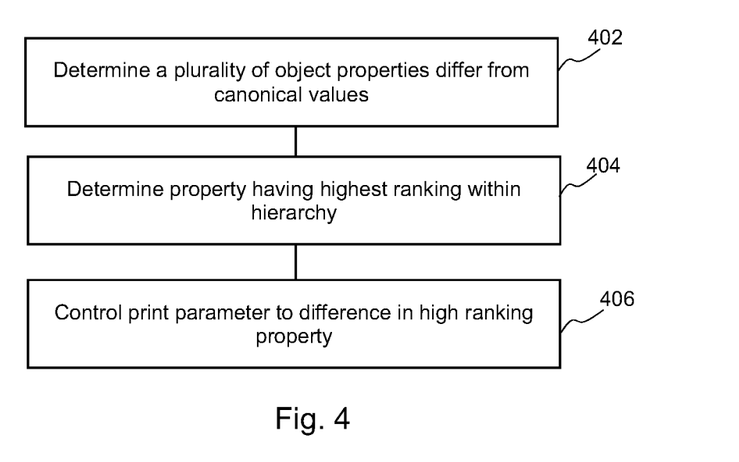
FIG. 4 is a flowchart of an example of a method for controlling print apparatus.

An example of a method of recalibration of an apparatus is described in relation to FIG. 4. In this example, it has been determined that there is a difference between the anticipated (in this example, canonical) values and the actual measured or inferred values for a plurality of object properties (block 402). In this example, some properties are prioritized over others according to a hierarchy for a particular application (e.g. an application where mechanical strength is most important). Therefore, in block 404, it is determined which of the properties having a difference is the highest priority property. At least one print parameter which will most effectively reduce the difference for that property is then controlled in a suitable manner (block 406). For example, if mechanical strength is prioritised over color, the domain of recalibration may be strength. This may mean that the recalibration of the apparatus is intended to impact the inferred property, without necessarily considering how the measured property, or another inferred property, may be affected. It may also mean that it is a deviation outside the tolerance range of a higher ranked property that prompts recalibration of a print apparatus.

In other examples, there may not be a hierarchy, or some properties may have equal rank within the hierarchy. In some such examples, a parameter, or combination of parameters, may be controlled for example to bring the greatest number of properties to within a tolerance of the intended or anticipated values.

Since, in some examples, and as mentioned above, density is a correlated quantity to color, color may also be calibrated by a calibration in the density domain to the extent of the relationship and the calibration mechanism applied in the color domain. Such calibration may not be applied in causal order (e.g., if, as may be the case, color differences are caused by density differences, it is still possible to measure color and infer density from it, since the two properties are correlated).

For example, it may be apparent from the test data that density tends to increase with an increased fusing temperature. Therefore, an indication that the color has departed from an anticipated canonical color value may be used to infer that the density has departed from anticipated value and compensation applied by changing the temperature. If both the inferred and measured property are affected by control of print parameters, this may allow closed loop control to be employed. For example, the color of each generated object may be measured and adjustments to control parameters made in response to the measurement. In other example, a subset of the objects generated may be measured. In other examples, an occasional or periodic test object may be generated, in some examples dependent on the quality specifications for a to-be-printed object.

Figure 5:
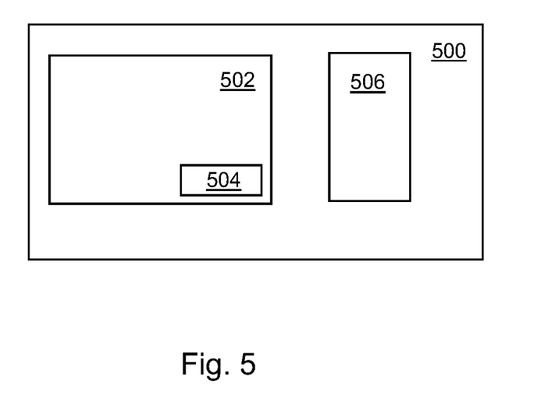
FIG. 5 is a simplified schematic of an example of object generation apparatus.

FIG. 5 shows a representation of object generation apparatus 500. The apparatus 500 comprises print apparatus 502 to generate an object, object analysis apparatus 504 to determine an indication of a first object property; and control apparatus 506 to control the print apparatus to generate an object having a second object property, based on the indication of the first object property. In some examples, the control apparatus may be employed during generation of an object such that generation of the second object property may be recalibrated during object generation. In this example, the object analysis apparatus 504 comprises a color measurement device to measure color (i.e. the first object property is at least one color). The second object property may be density, tensile strength, porosity, reflectance, surface roughness or the like. In examples, the color measuring device may be a colorimeter, camera, spectrophotometer, telespectro-radiometer or any other color measurement device.

In this example, the object analysis apparatus 504 is contained within the print apparatus 502. For example, the print apparatus 502 may comprise a fabrication chamber or the like in which an object is formed. In some examples, the object analysis apparatus 504 may measure an object property when the object is within a fabrication chamber. In some examples, this may allow the property to be measured sooner than may otherwise be possible as, in some examples, the object may remain in the fabrication chamber for cooling and the like. The control apparatus 506 in this example is able to control a plurality of print parameters. In particular, any or all of the printing speed, print agent drop number and size, fusing temperature, fusing time, preheating conditions, selection and/or amount of print materials such as agents, or the like, may be controlled.

The object generation apparatus 500 may be used to print and characterise test objects, initially without feedback. This may comprise, for example, obtaining measurements of a multiple properties—n that can be readily measured in-line, in some examples while the object is still inside an object generation apparatus 500 and m that are less readily measured (where $n \geq 1$ and $m \geq 1$). Relationships between the n in-line measurable and the m other object properties may be established as has been outlined above.

In other examples, a first object property may be measured during generation thereof, and used to recalibrate the apparatus with respect to the second object property during generation of the same object. For example, a measurement of the first object property could be made after a layer of the object is generated and print parameters modified for the generation of the subsequent layers.

While the relationship between color and density have been discussed above, relationships may also be seen for other properties. For example, color may have a relationship with (for example be correlated with) reflectance, which may be modelled for a set of physical objects, in some examples the set being produced by the same (or same type) or apparatus using the same print material combinations. In addition, as density can be inferred, further properties which are correlated with density, such as tensile strength (at least for certain materials), porosity (which may for example be correlated with the density of the print materials) and the like may also be inferred.

In subsequent print processes, measurements of the n property/properties may be used to infer values for any of the m other object property/properties for which a relationship has been established.

Furthermore, a calibration of print parameters affecting multiple object properties, which may be the measured properties or the inferred properties, may be based on measurements of the measured properties.

Figure 6:
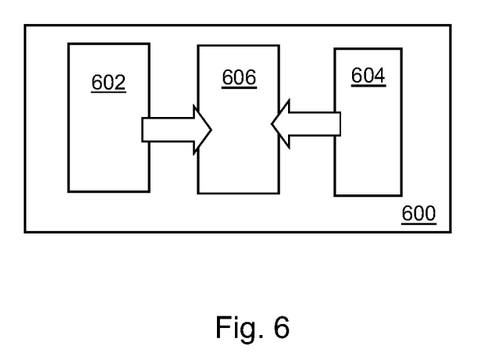
FIG. 6 is a simplified schematic of an example of processing apparatus.

FIG. 6 shows a schematic example of processing apparatus 600. The processing apparatus 600 comprises an interface 602, a memory 604 and a processor 606.

The interface 602 is to receive colorimetric data representing a property of a three-dimensional object generated by object generation apparatus (which may be, for example, an apparatus 500 as described in relation to FIG. 5). The memory 604 holds data indicative of a relationship between colorimetric data values and a second, non-colorimetric, property of an object generated by the object generation apparatus. The processor 606 is to determine, based on the colorimetric data and the relationship, an indication of a non-colorimetric property. Therefore, the processor 606 in this example characterizes or infers at least one non-colorimetric object property through a colorimetric measurement.

Further, in this example, the processor 606 is to determine if the non-colorimetric property is within a predetermined value range and, if not, to determine an adjustment to at least one print parameter of the object generation apparatus. Note it is the domain of an inferred property which prompts the adjustment in this example. This adjustment could for example be provided in the form of print control data, in which case the processing apparatus 600 may provide an input to control apparatus 506 as described in relation to the example of FIG. 5. In this example, the memory 604 further holds data indicative of an object property hierarchy indicating which object properties should be prioritised in adjusting print parameters. For example, it may be that mechanical, structural or functional properties are given a higher priority than appearance properties, and/or that certain properties are prioritised within such categories. The processor 606 may, in such an example, determine an adjustment to at least one print parameter of an object generation apparatus such that a higher priority property tends towards an intended value, even if this is at the expense of lower priority property. In other examples, an adjustment to print parameters which best corrects a set of properties may be determined, for example on the basis that it brings the greatest number of properties to within a tolerance of the intended or anticipated values. This may result in a more reliable and consistent object output over time.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, such as the processor 606, may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage (for example the memory 604) that can guide the computer or other programmable data processing devices (for example the processor 606) to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a feature or block from one example may be combined with or substituted by a feature/block of another example The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

What is claimed is:

1. A method comprising:
receiving data representing measurement of a reflected color of a three-dimensional object generated by a print apparatus;
determining a difference between the data representing the reflected color and predetermined data;
determining an estimate of a second non-color property of the object, that has not been measured, based on the difference between the measurement of reflected color and the predetermined data; and
controlling the print apparatus so that the second property tends towards a predetermined property value;
wherein controlling the print apparatus comprises controlling at least one of: a printing speed, a printing temperature, printing cycle order, a waiting period length, and power supplied to an energy source of the print apparatus.

2. A method according to claim 1 wherein the second non-color property is density.

3. A method according to claim 1 wherein determining an estimate of the second non-color property comprises using a predetermined relationship between reflected color and the second non-color property.

4. A method according to claim 1 wherein the predetermined data represents a canonical value for the reflected color of an object generated by the print apparatus.

5. A method according to claim 1 in which determining the estimate of the second property comprises determining an estimate of an offset from a canonical value for the second property for the print apparatus.

6. A method according to claim 1 further comprising controlling the print apparatus such that the reflected color tends towards a predetermined value.

7. Object generation apparatus comprising:
a print apparatus to generate an object;
object analysis apparatus to determine an indication of a value of a first object property of an object generated by the print apparatus, the first object property having a relationship to a second object property that cannot be measured using the object analysis apparatus that measures the first object property; and
control apparatus to control the print apparatus to generate, based on the indication of the first object property and the relationship, an object having a desired value for the second object property;
wherein the control apparatus is to control at least one of the speed of the print apparatus, a temperature of object generation, a printing cycle order, a waiting period length, power supplied to at least one energy source, and distribution of print materials.

8. Object generation apparatus according to claim 7 in which the object analysis apparatus is to measure reflected color of the object as the first object property.

9. Object generation apparatus according to claim 7 in which the object analysis apparatus comprises a color measurement apparatus.

10. Object generation apparatus according to claim 7 wherein the first property is a color of the object and the second property is density of the object.

11. Processing apparatus, comprising:
an interface to receive colorimetric data representing a reflected color of a three-dimensional object generated by an object generation apparatus;
a memory, to hold data indicative of a relationship between reflected color values and values characterising a non-colorimetric property of an object generated by the object generation apparatus; and
a processor to determine, based on the colorimetric data, an indication of a value of the non-colorimetric property;
the processor further to control the object generation apparatus so that the non-colorimetric property tends towards a predetermined property value by controlling at least one of: an object generation speed, an operating temperature, an object generation cycle order, a waiting period length, and power supplied to an energy source of the object generation apparatus.

12. Processing apparatus according to claim 11 in which the processor is further to determine if the value of the non-colorimetric property is within a predetermined value range and, if not, to determine an adjustment to at least one print parameter of the object generation apparatus.

13. Processing apparatus according to claim 12 which the memory holds data indicative of the relationship between reflected color values and values characterising plurality of non-colorimetric properties of an object generated by the object generation apparatus, and further holds data indicative of an object property hierarchy indicating which object properties should be prioritised in adjusting print parameters.

14. Processing apparatus according to claim 11 wherein the non-colorimetric property of the object is density of the object.

15. Processing apparatus according to claim 11 wherein the non-colorimetric property of the object is tensile strength of the object.

16. Processing apparatus according to claim 11 wherein the non-colorimetric property of the object is roughness of the object.

* * * * *